(12) United States Patent
Smith (10) Patent No.: US 7,251,663 B1
(45) Date of Patent: Jul. 31, 2007

(54) METHOD AND APPARATUS FOR DETERMINING IF STORED MEMORY RANGE OVERLAPS KEY MEMORY RANGES WHERE THE MEMORY ADDRESS SPACE IS ORGANIZED IN A TREE FORM AND PARTITION ELEMENTS FOR STORING KEY MEMORY RANGES

(75) Inventor: Randall Smith, Arlington, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 369 days.

(21) Appl. No.: 10/858,734

(22) Filed: Jun. 2, 2004

Related U.S. Application Data (60) Provisional application No. 60/566,878, filed on Apr. 30, 2004.

(51) Int. Cl.
 *G06F 7/00* (2006.01)
 *G06F 17/00* (2006.01)
(52) U.S. Cl. ............... 707/102; 707/3; 711/202
(58) Field of Classification Search ........... 707/102, 707/3, 1, 8; 711/216, 202, 170
 See application file for complete search history.

(56) References Cited

U.S. PATENT DOCUMENTS

| | | | | |
|---|---|---|---|---|
| 5,355,481 | A | * | 10/1994 | Sluijter ..................... 707/1 |
| 5,440,732 | A | * | 8/1995 | Lomet et al. ............. 707/1 |
| 5,819,292 | A | | 10/1998 | Hitz et al. |
| 5,963,962 | A | | 10/1999 | Hitz et al. |
| 6,038,570 | A | | 3/2000 | Hitz et al. |
| 6,282,605 | B1 | * | 8/2001 | Moore ..................... 711/103 |
| 2004/0133590 | A1 | * | 7/2004 | Henderson et al. ...... 707/102 |

* cited by examiner

*Primary Examiner*—Hong Kim
(74) *Attorney, Agent, or Firm*—Cesari & McKenna, LLP (57) ABSTRACT

An efficient method and apparatus for storing and retrieving memory ranges is disclosed. A key range that is stored or to be stored is associated with a node in the tree hierarchy encompassing the entire memory address space. All previously stored ranges are listed or otherwise associated with each node, and all possible nodes that may contain ranges that overlap the key range, regardless of starting or ending locations or range length, are found. Partitions are developed in the tree structure of the available address space and the width of the key range (w), the widths of the partitions (d), and the range of offsets in the starting location of the key range with respect to a partition (o) are used to develop a formula that finds a partition suitable for storing the key range. Hashing and dynamic tree building may be used.

12 Claims, 4 Drawing Sheets

METHOD AND APPARATUS FOR DETERMINING IF STORED MEMORY RANGE OVERLAPS KEY MEMORY RANGES WHERE THE MEMORY ADDRESS SPACE IS ORGANIZED IN A TREE FORM AND PARTITION ELEMENTS FOR STORING KEY MEMORY RANGES

RELATED APPLICATIONS

The present application claims the benefit of U.S. Provisional Patent Application, Ser. No. 60/566,878, which was filed on Apr. 30, 2004, of common title and inventor-ship, and which application is hereby incorporated herein by reference.

BACKGROUND OF THE INVENTION

1. Field of the Invention

The present invention relates to allocating memory, and more particularly to making efficient use of resources for tracking different overlapping memory ranges.

2. Background Information

Client/server systems communicating over the Internet or other such communications means are well known in the art. Use of virtual memory is typical if not pervasive where an application (resident in the client) addresses a wide range of memory without regard to the actual memory hierarchies. Virtual memory is well understood in the art. Operating systems (OS) provide the appearance to multiple applications that they each have access to their own exclusive address space (Virtual Address space or VA). The OS maps the applications' accesses to the VA to a shared physical memory address space. Applications, in this discussion cannot directly access the physical memory, they can only do so via the OS. VA and physical memory are organized as equal sized pages, where each VA page maps to a single physical page. Hardware and software resources are allotted in proportion to the number of VA pages in order to timely perform the translation.

Since this mapping occurs whenever memory is accessed, in practice the actual mapping is performed in hardware in order to minimize the time overhead expense of mapping.

Use of VA provides several important benefits, including, inter alia: a) Security: since applications cannot directly access the pages in other applications; b) Run time resources: applications that have large VA space may have very small physical memory. In such a case, a "fault" occurs when the application accesses a VA page that has no corresponding physical page. The OS handles all such problems in a prescribed manner. The OS may allot physical memory or it may suspend or kill the application.

However, when the application can directly access the input/output (I/O) hardware that addresses physical memory without going through the OS, problems arise that are not handled by the OS. In such a case the I/O hardware operates outside the OS. The present invention is directed to such problems.

An application addresses VA while I/O hardware addresses physical memory. So the application VA address must be translated into a physical hardware address and the hardware must maintain a "shadow copy" of the virtual/physical mapping being managed by the OS to prevent chaos. The I/O maintains a translation table and must provide resources proportional to the number of VA pages associated with each application in order to support system operation. Minimizing the entries (and therefore the resources used) into such an I/O translation table is an objective of the present invention.

It is understood that the physical address may be addressed to memory that is remotely accessed via a communications network using a standard protocol, e.g. TCP/IP. Such protocols will not be further discussed as they is well known in the art.

The interface provided to an application for I/O to memory generally specifies a range of memory, e.g. a "read" system call generally will include a pointer into memory and a size or length. A library implementing this task does not usually know what ranges the application will specify in advance. Thus if the library accesses the hardware directly and wants to minimize the hardware resources required, it should check to ensure that ranges received from the application do not overlap with previous ranges, and if the ranges overlap, the library should re-use the hardware translating table entries previously inserted. If none of the previously inserted entries suffice, the OS must be invoked so that new entries can be made into the translation table. It will be more efficient in time and resources if existing entries are used.

System hardware and software resources are needed for storage of the translation tables, specifically, a shadow copy of the translation tables is needed and held in the IO hardware. As an application (or other applications running on the same processor) requires more blocks of memory, more IO hardware resources are required. If these memory allocations are separate and distinct without overlap there will be no problems. However, if the allocations overlap, and/or if there are many (say, thousands) allocations that may overlap, the use of many holding registers may be an inefficient use of IO hardware resources. It would be more efficient if the overlapping memory ranges were each coalesced into one range; this requires resources proportional to only the number of pages in the range, not to the number of overlapping ranges.

In applications that store and retrieve ranges of values, as discussed above, it would be necessary to discover all the stored ranges that overlap a key range when that key range is retrieved or stored. A linear search would include comparing the starting locations of any two ranges and the length or the ending locations to determine any overlap. For many range insertions, this will be very time and resource consuming. Hashing techniques might be considered appropriate for such a task. As is well known in the art, hash functions and tables have been very efficient for searching for or storing an item among a long list of such items. Briefly, an item is stored (or found) in a location by using the item as the argument in a function, called a hash function. The result is an address where the item is to be stored. When applied to memory systems, this hash address may indicate a group of locations, usually called a bucket, where a number of items can be stored or retrieved. The bucket contents are usually linearly examined.

Hashing has many variations, such as using pointers or storing pointers, and techniques to handle technical issues. For example, when there is no room in a bucket "a collision" occurs when the system tries to store another item in the bucket. One technique is to store the item in another location that is tracked in "a scatter diagram." As is well known many such techniques have been developed with respect to "hashing."

However, applying hashing to the problem of finding overlapping ranges is not effective. The difficulty is that hits in the range database (implying an overlap of a key range with a previously inserted range) must occur even when the key range has a different starting location, length and ending location from any other previously inserted range. It is evident that any hash function that guarantees to map any two overlapping ranges to the same value can only succeed by mapping all the ranges to the same value. Such a function, by definition, is inefficient.

In such systems as discussed herein, the conversion from virtual to physical memory addressing is accomplished while preserving data integrity, there must be a mechanism for controlling the physical memory and searching for memory ranges allocated that may overlap other previously allocated memory ranges. Again the searching is for page ranges allocated in the IO hardware. The present invention is directed toward this task.

SUMMARY OF THE INVENTION

In view of the foregoing background discussion, the present invention provides a system and method that is efficient of system resources and time for retrieving overlapping ranges of data.

The present invention provides a method for finding in a memory address space, a previously stored memory range that overlaps a key memory range. The memory address space is organized into a tree with n levels and m branching from any higher level node. The number of nodes, or partition elements, N, in a level i is calculated by $N_i = m^i$. Within any given level the N nodes are each of a given size. The invention operates by finding all ranges that overlap the key range and searching the ranges previously inserted into each of the overlapping partition elements to see if they overlap the key memory range.

The present invention further provides for comparing the starting and ending address of the key memory range to the corresponding addresses of previously inserted ranges to determine if there is any overlap. A table may be formed of previously inserted ranges associated with each node wherein the lists are searched. In addition an index may be formed for each node, and that index may be used as the argument in a hash function where the key range is to be stored.

In a preferred embodiment, when an overlap is detected within a node, the partition tree is dynamically constructed by restricting the formation of any child node to a maximum of m−1 (one less than the number of branches from a node) and, if the node already contains m−1 elements, create m child nodes. If the insertion of the key range is unsuccessful, the creating of new child nodes may be repeated.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
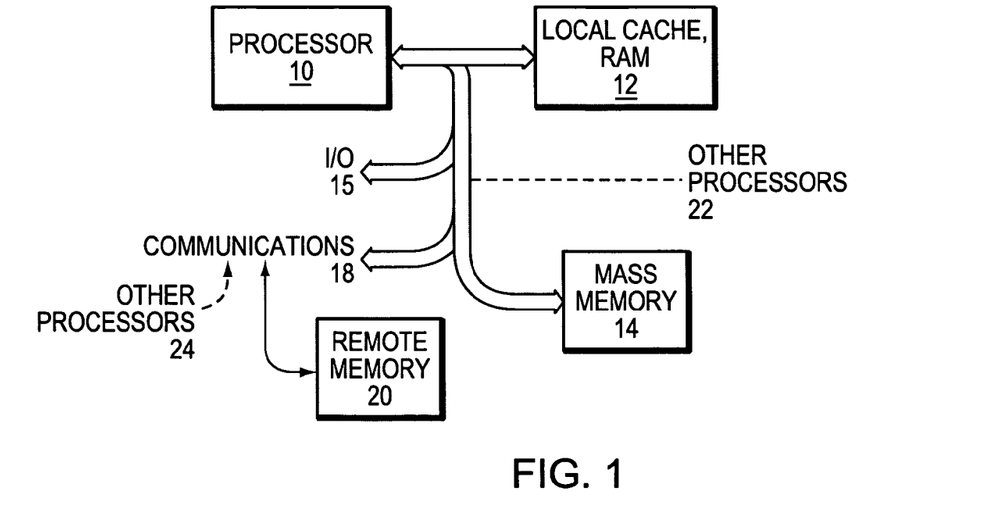
FIG. 1 is a block diagram of a computer system.

FIG. 1 is a high level block diagram of a computing system showing a processor (or processors) 10 with local RAM that may include cache 12, mass memory 14, an I/O interface 15, and a communications port 18, that may communicate with remote storage 20. In addition, other processors 22 may attach directly to the processor 10. Or other processors 24 may communicate with the processor 10 via the communications port 18. In fact the organization of such system may be very complex and inter-related. However, such systems and those skilled in the art will understand these complexities and the mechanisms that allow such system to operate efficiently.

Figure 2A:
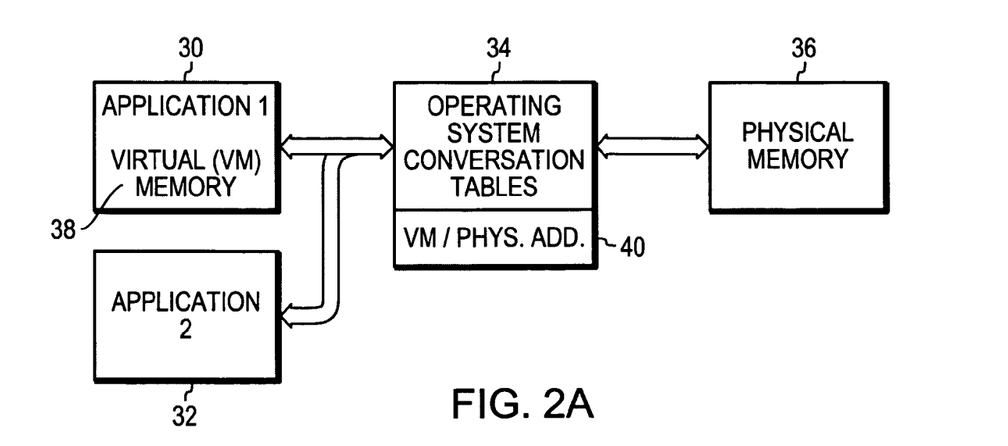
FIG. 2A is a block diagram indicating interaction between applications and an operating system.

FIG. 2A is another high level block diagram of one or more application programs 30, 32, an operating system 34, and physical memory 36. It is understood that more complex arrangements exist where the tasks and systems controlled by these software/hardware blocks as represented in FIG. 2A are distributed among the various programs. For example, physical memory and I/O devices might be controlled by an application rather than the operating system. However, in any case where an application addresses virtual memory 38, there must exist, in this case in the operating system 40, a means for translating the virtual memory address into a physical memory address. Moreover, if several applications share physical memory there must be a mechanism for resolving any conflicts in the allocation of memory among the various programs. In this case, the allocation is accomplished via tables and other programs that ensure data integrity. Such tables and programs are well known to those skilled in the art.

Figure 2B:
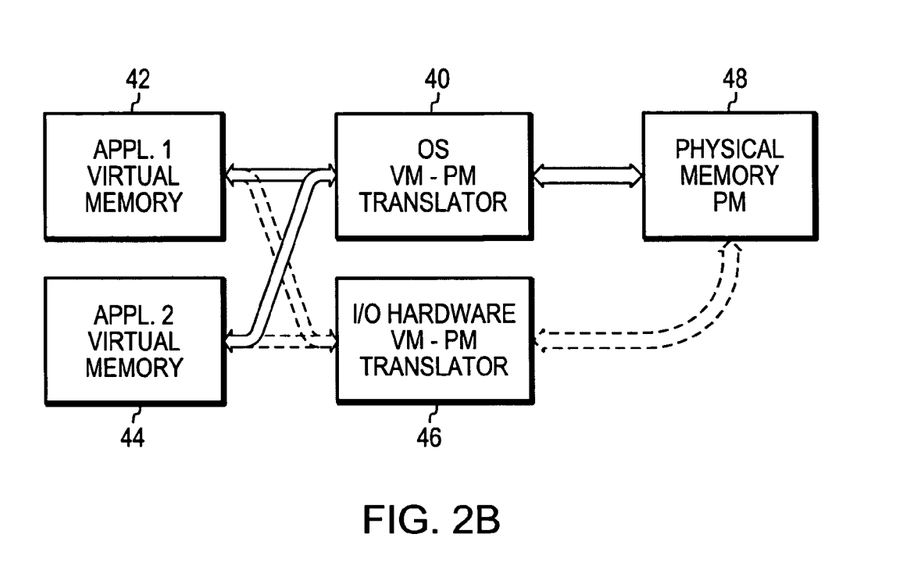
FIG. 2 is a block diagram illustrating address translation.

FIG. 2B is a high level block diagram showing that the process of translating addresses from virtual memory (VM) to physical memory (PM) 48 is accomplished by the operating system (OS) 40 VM to PM translation table. As shown Applications 1 and 2, items 42, and 44, have solid arrows to the OS 40. However, in the context addressing by the present system, the IO hardware 46 must keep a shadow copy of at least a subset of the translation tables held by the OS. This is so because the IO hardware, which accesses physical memory (PM), can accept communication directly from individual applications (without the OS mediating the communication) that specifies memory as virtual addresses.

Figure 2C:
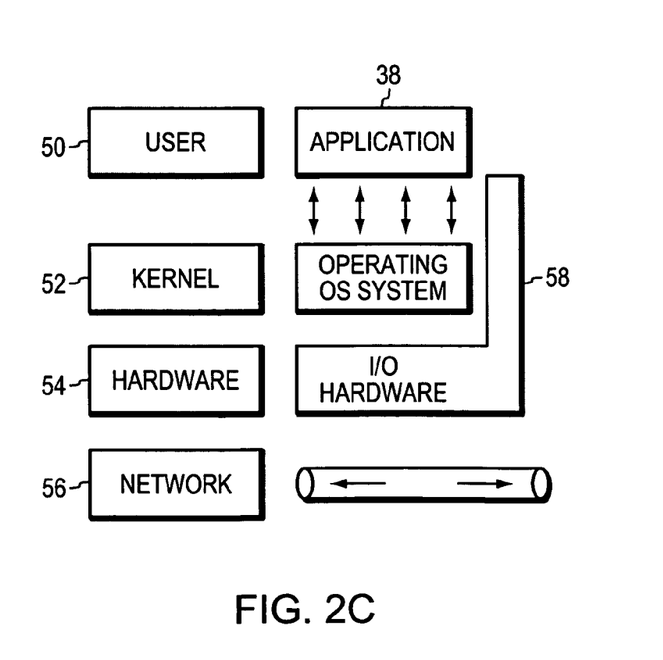
FIG. 2C is a block diagram illustrating control pathways.

FIG. 2C illustrates the control pathways in a preferred embodiment of the present invention. Here user applications 50 communicate with the operating system 52 that then communicates with the IO hardware 54. The hardware then transfers data across the network 56 or other controlled hardware devices. However, in the present invention a second control pathway 58 exists where applications communicate directly with IO hardware bypassing the OS. In order for this communication to occur, the IO hardware must first be able to "understand" the applications VM addressing as illustrated in FIG. 2B. The shadow translation tables being part of this "understanding."

Generally software may be implemented in hardware. Although (usually) less flexible, hardware is (usually) faster. Practitioners in the art will under stand that digital electronics of the form found in computers and shown in the block diagrams of FIG. 1 can be implemented as a preferred embodiment of the present invention. Although, the following preferred embodiments are described in software or program steps, these steps may be implemented in hardware. Moreover, there may be hardware/software combinations preferred embodiment of the present invention.

Figure 3:
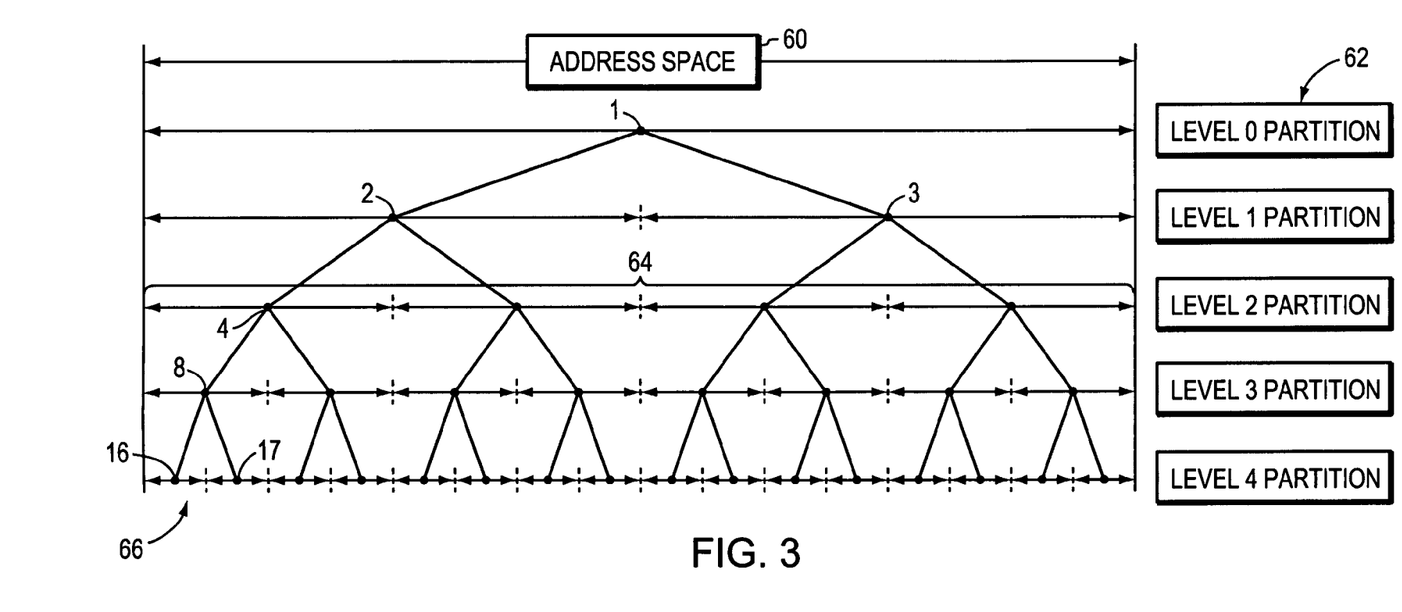
FIG. 3 is drawing representing virtual memory address space partitioned.

FIG. 3 illustrates a partitioned virtual memory Address Space 60 for a given system configuration where any and all memory ranges created by any one or many applications must occur. This configuration is a well known tree with five partition levels (0–4) and two branches from each node. Levels are referenced as n and nodes as N. In FIG. 3 there are two branches from each node, so the number of nodes N in any level n is found from the relationship $N=2^n$.

As is known generally, where there may be an n-ary tree/m-ary tree, n being the number of levels and m being the branching from each node, the address space would be divided at any level n into $N=m^n$ nodes.

The granularity or size of the memory ranges extends to any size from very small to very large. Within each partition level 62 the address apace is divided or partitioned into ranges in a binary fashion by having two branches from each node. Other preferred embodiments may have any number of branches. However, for this example, partition level 0 is divided into one range equal to the entire address space 60. Level 2 is divided into four ranges 64. Each partition is represented by a node, so, with respect to FIG. 3, level 0 has one range and one node, and level 1 has two partitions and two nodes, level 2 has four partitions, and so on. Herein a node, an element, a partition, and a partition element are used interchangeably, except if specifically noted, to represent a contiguous section of the addressable memory space. Also, a leaf node is a node from which no other nodes descend. So, in FIG. 1 the nodes at level 4 are all leaf nodes 66. A node that descends from another node is called a child of that parent node. In the context of this invention, such terms will be understood by those skilled in the art.

By observation from FIG. 3, every possible memory range within this address space 60 maps to a unique element in a unique level. Specifically, in the present invention, the smallest element within a level that completely contains a range to be inserted is selected. With respect to overlapping ranges, a well-defined subset of the partition elements may contain ranges that can overlap with any range associated with a particular element. Only these elements need to be searched when looking for overlapping ranges. For example, if a key range is to be inserted into say node 8, only nodes 16, 17 and any children thereof and the parents 4, 2 and 1 need be searched for overlapping ranges previously inserted.

The following describes two preferred embodiment variations of the present invention. In one variation a hashing step is added to aid in inserting and searching for ranges. This compensates for any clumping that may occur within an address space. This step has the benefit of reducing memory requirements while allowing most of the benefits of the present invention.

In the second variation, the tree of FIG. 3 is dynamically expanded as required. This addresses the specific application where overlapping ranges are not allowed. It is evident from inspection that any one element (a node partition) of any one level partition will be of a given memory size, and so there can be only a limited number of ranges within that element. This restriction simplifies the calculation and reduces the search time. When approximately equal length ranges are considered, the search time increases logarithmically with respect to the number of ranges inserted. With respect to FIG. 3 the number of "nodes," e.g. see numbered 1, 2, 3, 4, 8, 16 and 17, defines the number of partition elements that the address space could be divided into (elements of equal size) at that level. The dynamic character allows for allocation of nodes as needed so only sections of the partition tree may be allocated at any time.

With respect to FIG. 3 when a key range is to be mapped into this structure, the range is inserted into the smallest sized element in a corresponding level that completely contains the range. One approach is to start at the leaf node, the current node with a current range, that contains the starting address of the key range. If the key range fits completely into the current range, the task is complete. If the key range does not fit into the current range, a new current mode is set to be the parent node of the old current node, and the new current node range corresponds to the new current node. The process continues up the tree structure of FIG. 3 until the key range fits completely into the new current node. Another approach is to find the leaf nodes that contain the beginning and the ending addresses of the key range. Then find the parent node that contains both of these leaf nodes, and the key range will fit into that found parent node.

In operation, the present invention provides a range storage table with a convenient location associating a partition tree node that corresponds to the size of a range that is to be inserted. The range is referred to as a key range provided by the user. The present invention will find the smallest node element associated with the key range that is placed on a list associated with that particular node. In this case in order to find all ranges that overlap a key range provided by a user, all partition elements in the partition tree that overlap that key range are found and the range lists associated with those elements are searched. The range lists would be linearly searched.

As mentioned above a variation includes adding a hashing step. In this variation the node associated with the key range is found with ranges that must be searched, as described above. However, then, instead of inserting into and/or searching physical list structures in these memory ranges, an index number is associated with that partition element associated with the key range. In a preferred embodiment, the index for a node is assigned by counting from the root of the partition tree starting on the left to right from the top to the bottom, as shown in FIG. 3, as nodes, 1,2,3, and so on. An index number is used as the argument of a hash function into a fixed set of buckets. The set of hash buckets is selected as much smaller that the set of partition nodes that are being hashing. A benefit of this approach is that the parameters generating a large number of partition elements will not directly consume machine resources. Since hashing is well known in the art only a very brief description follows. A hash function takes an element to be stored in memory and transforms it into a location or a group of locations, a bucket, in a table. Many different types of hashing algorithms are known. One example involves taking the remainder when the index is divided by a prime number. The storage required is proportional to the prime number, the larger the fewer collisions. Collisions being the mapping of different partition elements to the same hash bucket.

When a key range is to be inserted into the range storage table, the partition tree node number corresponding to the key range is found and used as a hash key into a hash table. The key range is then placed on the list associated with the output hash table bucket.

Now to find all ranges overlapping the user provided key range, all partition elements in the partition tree that overlap that key are found and their associated hash buckets are searched. This will be the hash buckets corresponding to the parent nodes and any child nodes.

In a preferred embodiment, an exclusionary requirement can be added that no two ranges within the addressable memory space are allowed to overlap. In this instance the insertion of a range must include a lookup step to determine which already stored ranges, if any, overlap the range being inserted.

Storage of a key range in a non-leaf node is dependent on that range overlapping one of the division points between its child partition elements. If a key range does not overlap with more than one child partition, the appropriate place for storing that range will be in that child partition since the child will be large enough, or a large enough descendant of that child partition. So if the ranges are restricted to not overlap, the number of ranges stored in non-leaf partitions will be at most one less than m, the degree of branching of the tree, or m−1.

In yet another variation, appropriate where non-overlapping is required, the partition tree may be dynamically constructed. In this case all nodes in the tree may be restricted to a maximum of m−1 contained ranges. When an insertion would result in a leaf node containing more than m−1 ranges, the node's children should be constructed and the key range and the contained ranges distributed appropriately among the ex-leaf node and its children. In this case the storage requirements for the partition tree will be proportional to the number of ranges stored, and the search time (with assumptions mentioned below) through the tree relative to the number of ranges stored will be proportional to (log n) rather than the constant factor (n) improvement characteristic of the use of hash tables.

The use of hash tables collapses the base tree range structure into a set of hash buckets, while the dynamic tree construction only allots a portion of the original tree structure. Both variations are directed to reducing the overall amount of storage require, and the number of lists of storage elements (attached to hash buckets or directly to nodes).

A preferred embodiment of the present invention using the dynamic tree construction finds the partition tree node corresponding the user provided key range and searching all the partition elements that overlap from the range list associated therewith, as discussed above. However, in the dynamic case, if the node into which the key range is to be inserted contains m−1 elements already, then: m child nodes of the current node are created, all elements of the current node are distributed into these child nodes. An attempt then is made to insert the key range into an appropriate node that may be an original or a child node. The process may be repeated.

Figure 5:
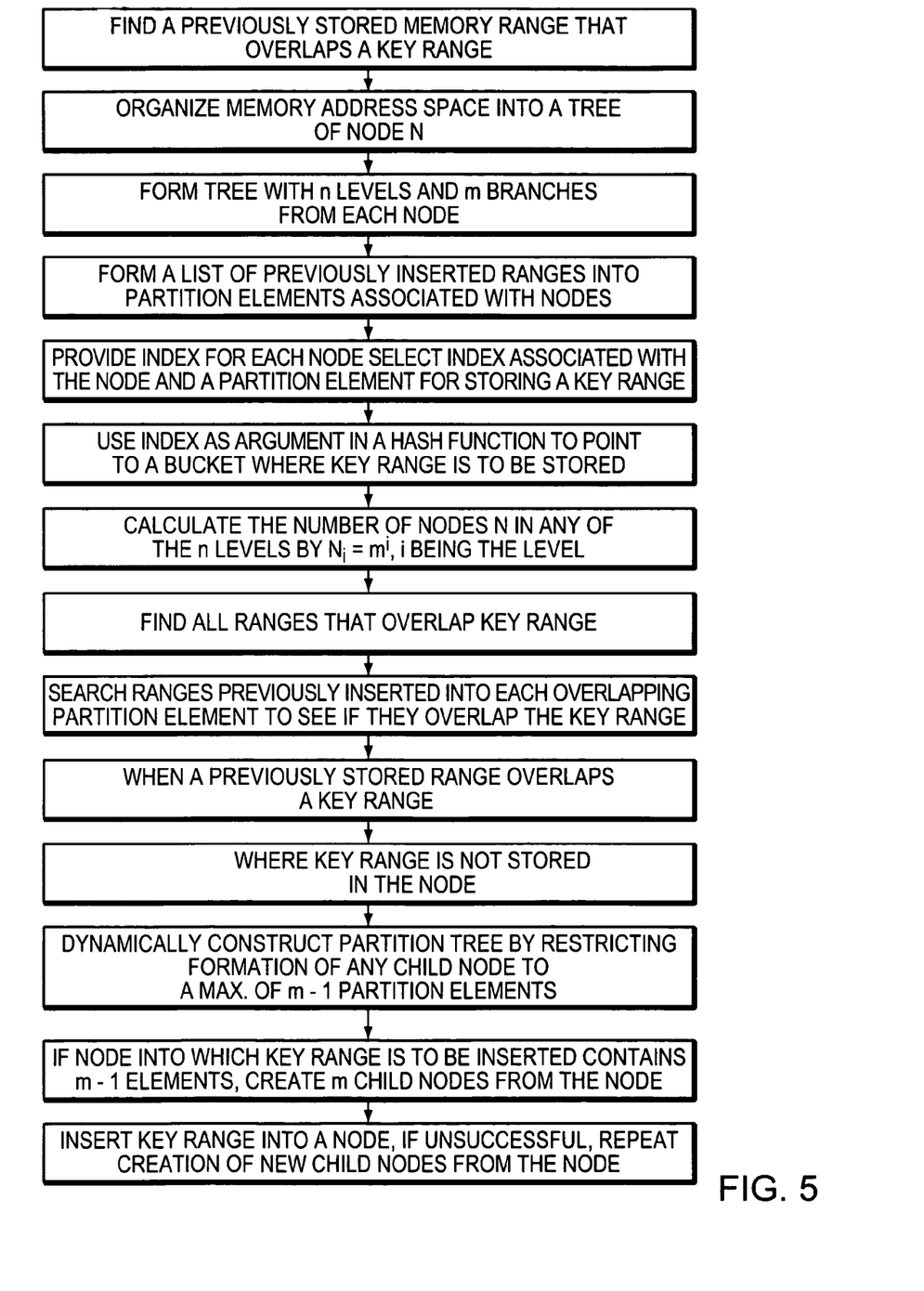
FIG. 5 is a flow chart illustrating the steps that determine a memory range overlapping a key memory range.

FIG. 5 is a flow chart illustrating the steps described herein.

Some applications may find an improved operation when high clumped address space is encountered by eliminating empty nodes with no or only one child. This will collapse the linear chains of parent-child relations that result when only a small part of the address space contains ranges.

Other applications that may benefit from the present invention include cooperating applications that share access to individual files. In general, shared access to resources by separate threads of execution requires some mechanism for reserving access to the resource for a short period of time, and then releasing the reservation. Typically, when an application accesses a file, the application locks that file only allowing itself to write or read in the file. However, recently, some sets of applications have been written with a finer grain model of access to the resource. In this model, the individual applications reserve access to sub-sections or ranges of data within the file rather than the entire file. In this model other applications in the set sharing files would have access to the unreserved sections of the file.

The entity (a file server or operating system) that locks a section of a file must be able to quickly determine, upon a lock reservation request, whether or not the range of is data requested for locking conflicts with, that is overlaps with, any other range already reserved and locked. Thus in such cases the present invention of range storing where overlaps are quickly detected. In certain variations, a range is entered in the store if-and-only-if the range does not overlap with any previously entered range.

The performance of the present invention can be measured from look-up costs and its efficiency compared to a linear search of the address space. The look-up costs will be approximately proportional to the number of nodes that must be searched for a given input range, and the efficiency will be will be proportional to the ratio of the ranges stored in the nodes searched to the total number of ranges stored in the tree. As discussed below, if the additional hashing step is used, the ratio efficiency will the number of ranges stored in all hash buckets searched divided by the number of ranges stored in the tree.

The following will describe:

a) For a single level of the partition tree, the average expected number of partitions that a given key range will overlap.

b) The total number of partitions in all levels of the tree that a given key range will overlap.

c) The expected improvement over the linear search for the base algorithm.

d) The expected improvement for the hash and dynamic tree creation variations.

Figure 4:
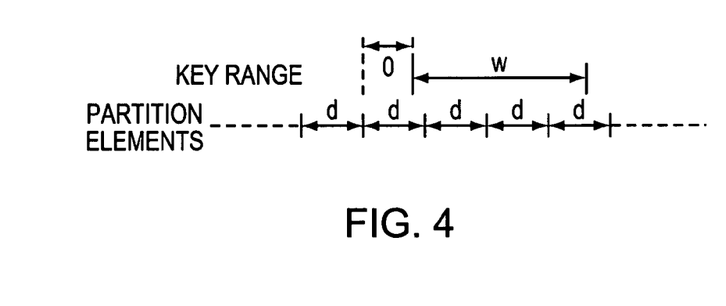
FIG. 4 is a diagram showing insertion of a key memory range.

We take the key range width as w, the partition widths as d, and assume that the address space is very large compared to d to avoid concerns about edge effects (see FIG. 4). Under these assumptions, the expected (averaged over all possibilities) number of partitions that the key range will overlap is:

$$N(w,d) = 1 + (w-1)/d \qquad \text{Eq. 1}$$

The total number of partitions in all levels of the tree which may contain ranges overlapping an input key range will be the sum of N(w,d) for each level within the tree. We will refer to this by the function N(w,n,m); this is to seen as a different function than N(w,d) because of its three arguments and dependence on m, the branching factor in the tree. The value for this function is:

$$N(w, n, m) = n + \frac{w-1}{A}\left(\frac{m^n - 1}{m - 1}\right). \qquad \text{Eq. 2}$$

Calculating the search improvement over linear search follows with the assumption that the distribution of ranges over the partition tree nodes is uniform. This assumption is inaccurate but will be useful for estimating the expected non-uniform distributions.

The total number of nodes in a partitioned tree is m-1, so the improvement R will be the ratio of the number searched under the present invention compared to the total number of nodes or:

$$R(w, n, m) = \frac{N(w, n, m)}{m^n - 1} \qquad \text{Eq. 3}$$

With some calculation and the assumption that $$\frac{m^n - 1}{m - 1} \approx m^{n-1} \qquad \text{Eq. 4}$$

this value is found to be:

$$R(w, n, m) = \frac{n + \frac{w-1}{d_{n-1}}}{m^n - 1}. \qquad \text{Eq. 5}$$

The above leads to the fact that the order of improvement depends on the relationship between n and (w−1)/d. Two cases are evaluated, the first where n>>(w−1)/d, and two where n<<(w−1)/d. In the first case where the key ranges are about the same size or smaller that the partition elements the improvement is:

$$R(w, n, m) = \frac{n}{m^n - 1}. \qquad \text{Eq. 6}$$

Here it is necessary to search a fraction of the tree nodes proportional to the logarithm (base m) of the number of nodes in the tree.

In the second case where the key ranges are generally much larger than the partition elements the improvement is:

$$R(w, n, m) = \frac{w - 1}{Am}. \qquad \text{Eq. 7}$$

So the ratio R is constant as long A m<<n.

In the case including a hashing step, if it is assumed that every node in the tree has an associated unique index or value, e.g. its order in a breadth first search of the tree; and that the hashing function maps from this value to a set of values much smaller in number than tree nodes; and that the hashing function smoothes out any clumping where the ranges occur within the address space so that about equal numbers of ranges land in each hash bucket. In this case several benefits accrue. Besides smoothing out address clumping, the base data structure, before any range insertion, requires a size proportional to the number of hash buckets rather than the number of nodes. If h is the number of hash buckets and assume h<<m−1, then $$R(w, n, m) = \frac{n + \left(\frac{w-1}{A}\right)\left(\frac{m^n - 1}{m - 1}\right)}{h}. \qquad \text{Eq. 8}$$

In order for this R to be small, thus an improvement, $$h \gg n + \left(\frac{w-1}{A}\right)\left(\frac{m^n - 1}{m - 1}\right). \qquad \text{Eq. 9}$$

This requires that n and m are selected so that:

$$\left(\frac{A(m-1)}{w-1}\right) \gg 1 \qquad \text{Eq. 10}$$

Assuming $m^n \gg n$.

In the preferred embodiment using dynamic tree expansion, if the number of entries in each node is less than m combined with a dynamic tree expansion will result in a tree containing a number of nodes equal to g/(m−1), where g is the number of ranges. Here the number of nodes in the tree will be proportional to the number of ranges inserted.

In this case the tree is balanced, and if the key ranges are about of equal size, the leaf nodes will be about of equal size and the search time will be logarithmic in g. If the ranges are unevenly distributed over the entire tree, the nodes created will reflect the actual distribution of the input key ranges, and hence the balanced estimate should be approximately correct It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A method for finding in a memory address space, a previously stored memory range that overlaps a key memory range, the method comprising the steps of:
   organizing the memory address space in a tree with n levels and m branching from nodes, wherein a number of nodes N in a level i is calculated by $N_i = m^i$, and wherein at any level in the tree the memory address space is divided into N nodes each of a given size,
   finding all ranges that overlap the key memory range, and searching ranges previously inserted into each overlapping partition elements to see if ranges previously inserted overlap the key memory range, wherein n, m, N, and i are positive integers, where n is greater than 1.

2. The method of claim 1 wherein the step of searching for overlapping ranges includes the steps of:
   comparing the starting and the ending address of the key memory range to the starting and ending address of the previously inserted ranges, and
   determining that the key memory and a previously inserted range overlap when at least one memory address in the key memory range is found in a previously inserted range.

3. The method of claim 1 further comprising the steps of:
   forming a list or table of previously inserted ranges into partition elements associated with nodes, and
   associating each list with one node, wherein the searching for overlapping ranges includes searching the lists associated with the overlapping node elements.

4. The method of claim 1 further comprising the steps of:
   providing an index for each node in the tree,
   selecting the index associated with the node and a partition element for storing a key range,
   using the index as an argument in a hash function to point to a bucket where the key range is to be stored.

5. The method of claim 1 further comprising the step of determining that a previously stored range overlaps the key memory range, whereupon the key memory range is not stored in the selected node.

6. The method of claim 5 wherein when an overlap is found the partition tree is to be dynamically constructed by performing the steps of:
- restricting the formation of any child node to a maximum of m−1 partition elements,
- if the node into which the key range is to be inserted already contains m−1 elements, creating m child nodes from the selected node, and
- attempting to insert the key range into an appropriate node, and if unsuccessful, repeating the creating new children of the appropriate node.

7. Apparatus for finding in a memory address space, a previously stored memory range that overlaps a key memory range, the apparatus comprising:
- memory having an address space organized in a tree with n levels and m branching from nodes, wherein a number of nodes N in a level i is calculated by $N_i = m^i$, and wherein at any level in the tree the memory address space is divided into N nodes each of a given size,
- means for finding all ranges that overlap the key memory range, and
- means for searching ranges previously inserted into each overlapping partition elements to see if the ranges previously inserted overlap the key memory range, wherein n, m, N, and i are positive integers, where n is greater than 1.

8. The apparatus of claim 7 wherein the means for searching for overlapping ranges comprises:
- means for comparing the starting and the ending address of the key memory range to the starting and ending address of the previously inserted ranges, and
- means for determining that the key memory and a previously inserted range overlap when at least one memory address in the key memory range is found in a previously inserted range.

9. The apparatus of claim 7 further comprising:
- means for forming a list or table of previously inserted ranges into partition elements associated with nodes, and
- means for associating each list with one node, wherein the searching for overlapping ranges includes searching the lists associated with the overlapping node elements.

10. The apparatus of claim 7 further comprising:
- means for providing an index for each node in the tree,
- means for selecting the index associated with the node and a partition element for storing a key range, and
- means for using the index as an argument in a hash function to point to a bucket where the key range is to be stored.

11. The apparatus of claim 7 further comprising means for determining that a previously stored range overlaps the key memory range, whereupon the key memory range is not stored in the selected node.

12. The apparatus of claim 11 wherein when an overlap is found the partition tree is to be dynamically constructed as comprising:
- means for restricting the formation of any child node to a maximum of m−1 partition elements, and
- if the node into which the key range is to be inserted already contains m−1 elements, means for creating m child nodes from the selected node, and
- means for attempting to insert the key range into an appropriate node, and if unsuccessful.

* * * * *